United States Patent [19]

Divens et al.

[11] 4,445,751

[45] May 1, 1984

[54] METAL COATED, TAPERED, OPTICAL FIBER COUPLED TO SUBSTRATE AND METHOD OF FABRICATION

[75] Inventors: William C. Divens, Penn Hills; Eugene G. Vaerewyck, Pittsburgh, both of Pa.

[73] Assignee: Westinghouse Electric Corp., Pittsburgh, Pa.

[21] Appl. No.: 312,555

[22] Filed: Oct. 19, 1981

[51] Int. Cl.³ .............................................. G02B 5/174
[52] U.S. Cl. ............................... 350/96.14; 350/96.15; 350/96.17; 156/637
[58] Field of Search ............................... 156/637, 643; 350/96.12, 96.13, 96.14, 96.15, 96.17, 96.20, 320, 96.33; 356/351

[56] References Cited

U.S. PATENT DOCUMENTS

| 3,548,189 | 12/1970 | Meinel et al. | 156/643 X |
| 3,592,773 | 7/1971 | Müller | 156/637 |
| 3,756,688 | 9/1973 | Hudson et al. | 350/96.33 |
| 4,186,994 | 2/1980 | Denkin et al. | 350/96.17 |
| 4,273,445 | 6/1981 | Thompson et al. | 350/96.17 |
| 4,340,272 | 7/1982 | Papuchon et al. | 350/96.14 |
| 4,390,236 | 6/1983 | Alferness | 350/96.14 |
| 4,396,247 | 8/1983 | Simon et al. | 350/96.20 |

FOREIGN PATENT DOCUMENTS

| 21871 | 1/1981 | European Pat. Off. | 350/96.20 |
| 55-4021 | 1/1980 | Japan | 350/96.15 |
| 55-11263 | 1/1980 | Japan | 350/96.33 |
| 1416154 | 12/1975 | United Kingdom | 350/96.15 |

*Primary Examiner*—John D. Lee
*Assistant Examiner*—Frank González
*Attorney, Agent, or Firm*—J. B. Hinson

[57] ABSTRACT

The invention comprises an optical interferometer system utilizing optical fibers. Titanium is diffused into the surface of lithium niobate substrate to form an optical waveguide utilized by the interferometer. The central portion of the optical waveguide is divided into two substantially parallel sections. Grooves between and alongside the optical waveguide are etched into the surface of the lithium niobate to optically decouple the waveguide sections from each other and from the substrate. A first electrode is positioned between the parallel sections of the optical waveguide with second and third electrodes positioned alongside these sections. These electrodes are utilized to subject the optical waveguides to an electrical field to differentially modulate the velocity of optical energy in the parallel sections or waveguide in response to an electrical signal. This differential modulation of the velocity of optical energy permits enhancement of attenuation of the propagating light to develop in the waveguide. Along two edges of the optical interferometer, small shelves are formed in the ends of the substrate to expose the ends of optical waveguide. Optical fibers are tapered by selectively etching the cladding and the core. A metal layer is formed on the tapered portion of the cladding to prevent light from escaping from the optical fiber. Micro-positioners are utilized to position the exposed ends of the core adjacent the exposed ends of the waveguides and the optical fiber is affixed in this position with a material which adheres to both the optical fiber and the lithium niobate substrate.

6 Claims, 6 Drawing Figures

IONIZED ARGON STREAM

METAL COATED, TAPERED, OPTICAL FIBER COUPLED TO SUBSTRATE AND METHOD OF FABRICATION

BACKGROUND OF THE INVENTION

1. Field of the Invention

The invention relates to optical systems and more specifically to optical interferometers utilizing optical waveguides.

2. Description of the Prior Art

Optical fibers and optical transmission lines are well known in the prior art. An optical interferometer using optical waveguides is disclosed in a patent application filed by Masuta et al., Ser. No. 276,767 and assigned to the same assignee as this application. Prior art efforts to butt couple optical fibers to optical waveguides have resulted in high losses due to the interface between the optical fiber and the optical transmission line. These losses are attributable to two primary mechanisms, these being the mismatch of the index of refraction between the optical fiber and the optical waveguide, and the optical misalignment between them. These problems are substantially solved by the optical interferometer and methods which are the subject of this application.

SUMMARY OF THE INVENTION

The invention comprises an optical interferometer and methods for efficiently coupling light into and out of the optical waveguides. The preferred embodiment of the invention comprises an optical end interferometer comprising two substantially parallel sections of optical waveguide. The two sections of optical waveguide are formed in an electro-optically sensitive substrate with electrodes affixed to the surface of the substrate utilized to subject the two optical waveguides to a differential electric field to change and differentially modulate the velocity of light through the sections of optical waveguide. The output of the two parallel sections of the optical waveguide are combined such that the different velocity through the two paths can result in enhanced or attenuated amounts of light transmitted through the output end of the interferometer. Input and output coupling to the optical interferometer is provided by a single mode optical fiber having a section of the cladding tapered and coated with a metal to reduce light emanating from the cladding of this section. The end of the core of the single mode optical fiber is polished and affixed to the ends of the optical waveguide with a material which adheres to both the substrate and the single mode optical fiber. This material has an index of refraction selected to increase the coupling efficiency between the single mode optical fibers and the interferometer.

DETAILED DESCRIPTION

Figure 1:
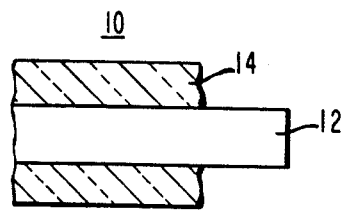
FIG. 1 is a cross section of a segment of a single mode fiber.

FIG. 1 is a cross section drawing of a portion of a single mode optical fiber 10. As is conventional, the optical fiber 10 includes a core 12 having diameter in the general range of 6 microns. A cladding 14 surrounds and is affixed to the core 12 and has a diameter in the general range of 90 microns. Optical fiber 10 is a typical optical fiber of the type utilized in the invention.

Figure 2:
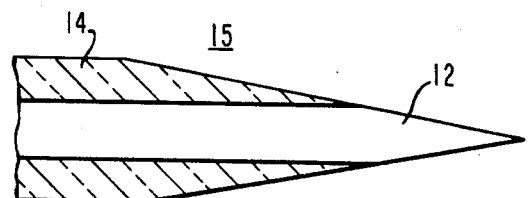
FIG. 2 is a cross section of a single optical fiber after being tapered in accordance with the process described in this application.

In preparing the optical fiber 10 for use in accordance with the invention, the optical fiber 10 is first cut so that the core 12 is substantially flat with respect to the cladding 14. A cone-shaped section 15 as illustrated in FIG. 2 is then formed at the end of the optical fiber by uniformly tapering (in accordance with a process subsequently discussed) the optical fiber with the length of the cone-shaped section 15 generally being in the neighborhood of one inch.

Figure 3:
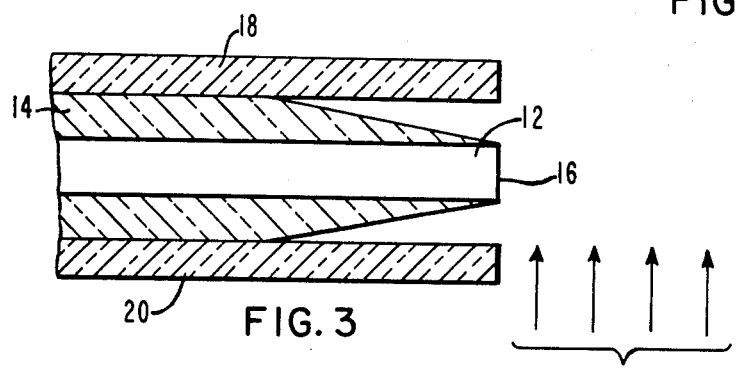
FIG. 3 is a diagram illustrating the polishing of the exposed end of the core of a single mode optical fiber.

Before the cone-shaped section 15 can be utilized in accordance with the invention, it is necessary to remove the pointed portion of the core 12 to form a flat and polished end, generally illustrated as reference numeral 16 in FIG. 3. As will be appreciated by those skilled in the art, the single mode optical fiber 10 is extremely fragile in that it is typically glass and has a diameter typically in the neighborhood of 90 microns, as discussed above. The fragility of the optical fiber 10 is increased by the tapered end portion. This being the case, polishing the end of portion 16 of the core 12 is a delicate process. Functionally, this polishing can be accomplished by positioning the cone-shaped section 15 between first and second plates 18 and 20, preferably made of glass, such that the end of the cladding 14, terminates at approximately the edge of the glass plates, 18 and 20. A stream of ionized argon gas is then directed (using conventional techniques) perpendicular to the exposed portions of the core 12. This effectively removes the pointed portion of the core 12 and produces a polished end portion 16 as illustrated in FIG. 3.

Figure 4:
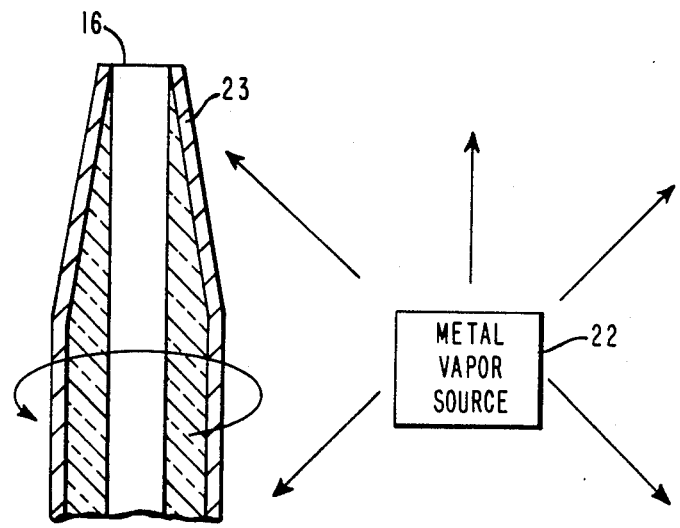
FIG. 4 is a diagram illustrating the process for coating a tapered portion of the cladding of a single mode optical fiber with a metal layer.

Following removal of and polishing of the end portion 16 of the core 12, the tapered portion of the cladding is coated with a thin metal layer, utilizing a process functionally illustrated in FIG. 4, to form a cone-shaped coupling section. In forming the metal layer the optical fiber is positioned vertically with the polished end 16 higher than the metal vapor source 22. A conventional metal vapor source, for example, a vapor source of the type used to deposit aluminum layers in the semiconductor art is usable in the illustrated process. The cone-shaped section 15 is then rotated with respect to the metal vapor source 22 for a sufficient time period to deposit a thin layer of aluminum (for example) on the outer surface of the cone-shaped cladding. This layer eliminates the light escaping through the outer surface of the cone-shaped section 15.

A process for conveniently tapering the optical fibers is essential in forming the metal coated cone-shaped section 15 described above. Typical single mode optical fibers are composed of glass and the tapered sections can be conveniently formed by an etching process using hydrofluoric acid. This process is illustrated in FIG. 5.

Functionally, a container 24 having therein a suitable amount of hydrofluoric acid 25 is supported on a suitable flat surface 26. Suspended above the surface of the hydrofluoric acid 25 is a circular disk-like member 28 suspended by a cable 30 near its center. The flat surface of the disc-shaped member 28 contains a series of openings through which single mode optical fibers 32, 34, 36 and 38 pass. Disc member 28 can conveniently be made of nylon or teflon with the openings having a diameter which permits the single mode optical fibers 32, 34, 36 and 38 to be passed through but have sufficient friction to retain the optical fibers 32, 34, 36 and 38 in the desired position.

Figure 5:
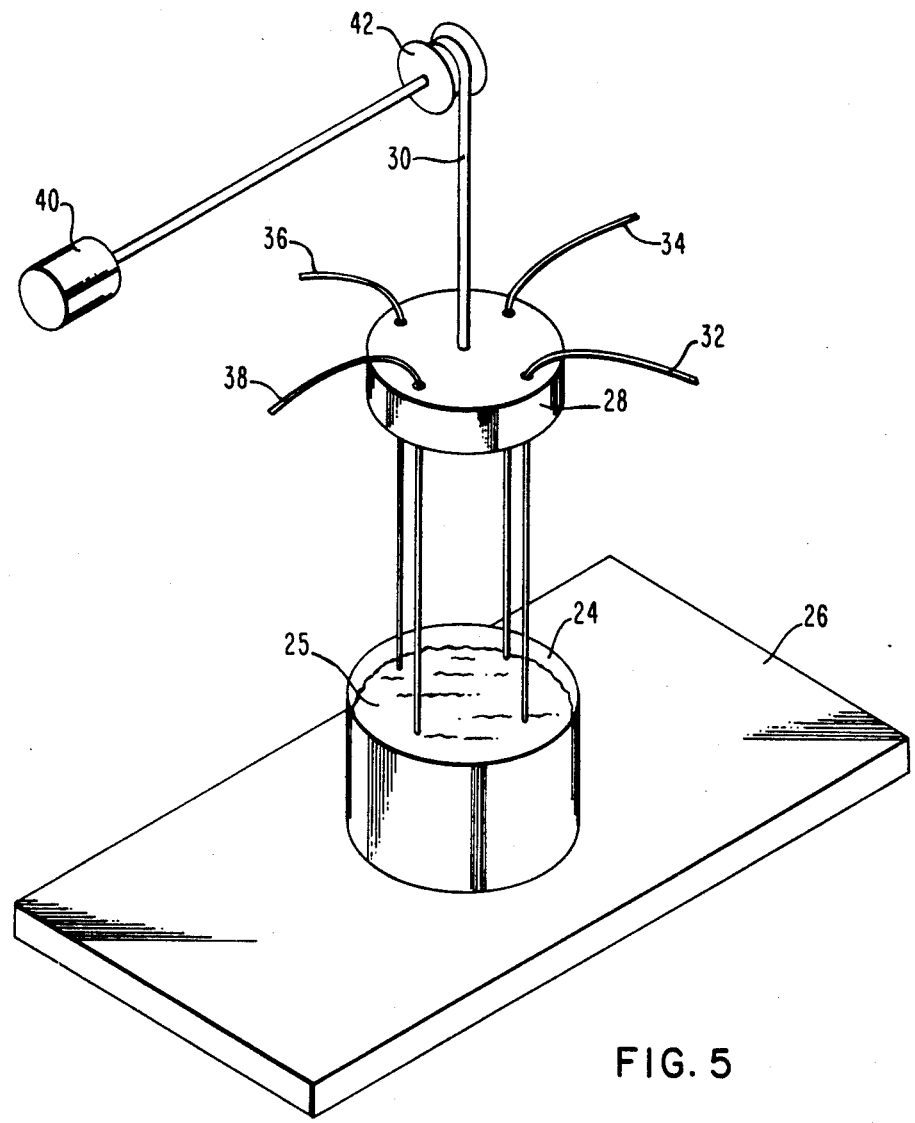
FIG. 5 is a diagram illustrating the process for tapering single mode optical fibers.

After the optical fibers 34, 36 and 38 have been positioned as shown in FIG. 5, an electrical motor 40 is energized to rotate a pulley 42 such that the optical fibers 32, 34, 36 and 38 are withdrawn from the hydrofluoric acid at a constant rate.

The etching rate of the optical fibers 32, 34, 36 and 38 is affected by the concentration of the hydrofluoric acid 25 as well as the temperature. The length of the tapered section is, of course, determined by the etching rate and the rate at which the optical fibers are withdrawn from the hydrofluoric acid 25. In practice, a temperature, acid concentration and withdrawal rate are selected to give the desired length for the tapered section. Currently it is believed that the most desirable length for the tapered section is in the general neighborhood of one inch.

Although the etching process is illustrated in FIG. 5 using four optical fibers 32, 34, 36 and 38, more or less optical fibers may be used.

Figure 6:
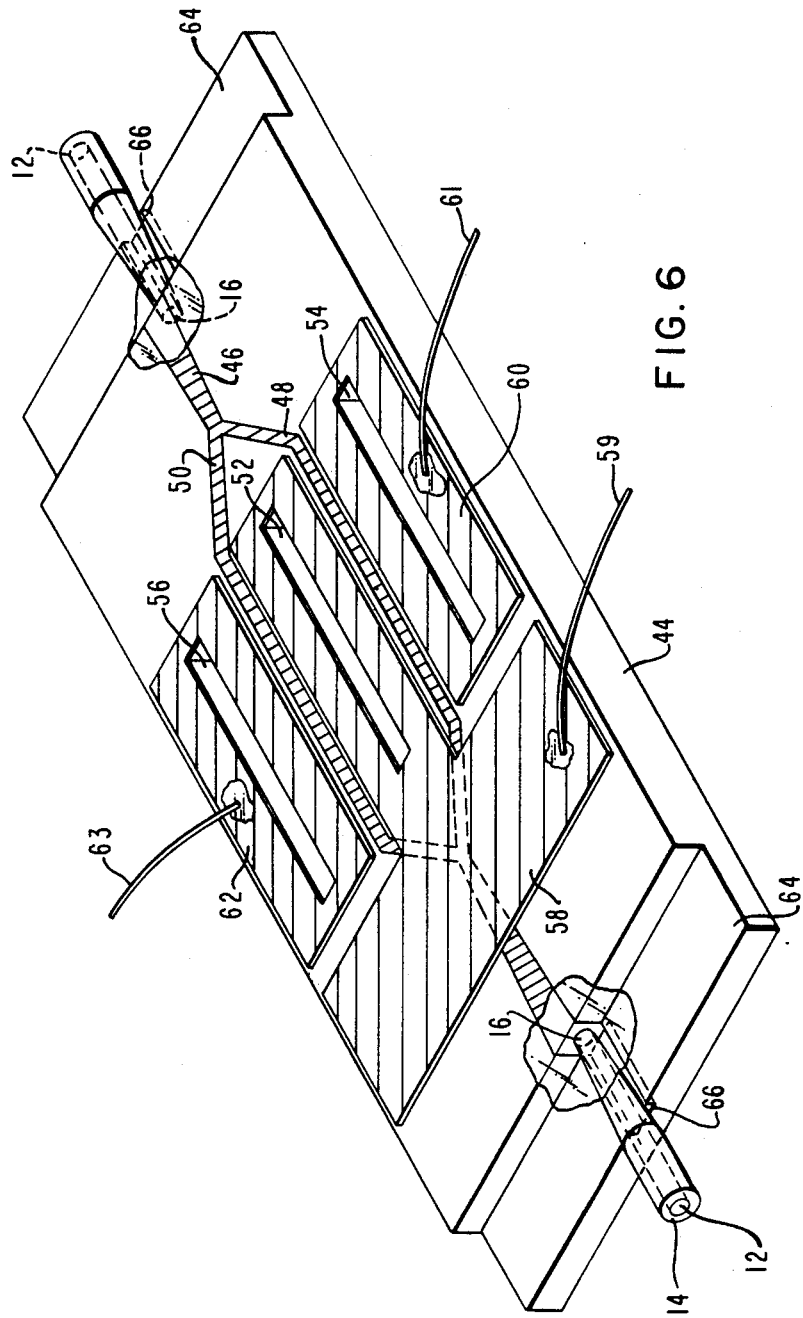
FIG. 6 is a diagram of an optical interferometer system.

FIG. 6 is a diagram of an interferometer system utilizing the cone-shaped fiber optic coupling devices of the type discussed above. The interferometer system utilizes an optical waveguide interferometer formed in a lithium niobate substrate 44.

An optical waveguide 46 formed in the upper surface of the lithium niobate 44 is made by diffusing titanium into the lithium niobate substrate 44. Near the center of the interferometer, the optical waveguide 46 is divided into two branches 48 and 50 which include central portions which are substantially parallel. A first groove 52 is etched in the upper surface of the lithium niobate substrate 44 in an area between the substantially parallel portions of the optical waveguide 46. Second and third grooves, 54 and 56, are also etched in the upper surface of the lithium niobate substrate 44 adjacent the substantially parallel portions of the two branches 48 and 50 of the optical waveguide 46. Generally, these grooves penetrate the lithium niobate substrate 44 to a depth that substantially equals or is in excess of the depth of the optical waveguide 46. Functionally, these grooves reduce cross coupling between the substantially parallel portions of the optical waveguide 46 and reduce transmission of light into the lithium niobate substrate along the outer edges of the substantially parallel portions of the optical waveguide 46. This substantially improves the operation of the interferometer. The common waveguide 46 provides a convenient means for coupling optical energy into and out of the two branches, 48 and 50. Other coupling techniques could also be used.

A first metallic electrode 58 is affixed to the upper surface of the lithium niobate substrate 44 and extends over the area between the substantially parallel portions of the branches 48 and 50 of the optical waveguide 46. Second and third electrodes, 60 and 62, are similarly affixed to the lithium niobate substrate 44 adjacent to the substantially parallel portions of the branches 48 and 50 of the optical waveguide 46. These electrodes are utilized to selectively subject the parallel portions of the branches 48 and 50 of the optical waveguide 46 to a differential electric field.

This differential electric field can be conveniently established by coupling a first voltage source between electrodes 58 and 60 utilizing leads 59 and 61 respectfully affixed thereto; and a second voltage source between electrodes 58 and 62 utilizing leads 59 and 63. Since the velocity of light propagation through the diffused waveguides formed in the lithium niobate substrate 44 is a function of the electric field to which they are subjected, this arrangement permits the velocity of light in one of the parallel sections of the branches 48 and 50 of the optical waveguide 46 to be increased while the other one is decreased. Alternatively, the velocity in one path could be maintained constant and the velocity in the other path modified. This permits intensification or attenuation of the transmitted light at the point where the substantially parallel portions of the optical waveguide join and form a single waveguide 46.

From inspection it is obvious that the optical interferometer illustrated in FIG. 6 is symmetrical and bidirectional. That is, light can be transmitted in either direction with equal efficiency and there is essentially no structural difference between the optical input and output of the interferometer. For that reason the same reference numbers will be utilized to identify the same structural features at both ends of the interferometer.

Coupling is provided to the ends of the optical waveguide 46 by cone-shaped coupled sections 15 of the type illustrated in FIG. 4. The lithium niobate substrate 44 has small shelf-like portions 64 etched in the upper surface at each end. Additionally the shelf portions 64 include small grooves 66 which aid in positioning the cone-shaped coupling sections 15 in abutting relationship with the ends of the optical waveguide 46. Structurally the shelf portions 64 have a depth approximating the diameter of the core portion of the optical fiber. The depth of the groove 66 is small as compared to the shelf portion 64. In assembling the interferometer system, micro-manipulators of a conventional type are utilized to position the polished end sections 16 in abutting relationship with the exposed ends of the optical waveguide 46. A small amount of optical grade epoxy is then positioned above the junction of the optical fiber 10 and the ends of the optical waveguide 46. The epoxy flows around the cone-shaped coupling sections and between the ends of the optical waveguide 46 and the polished ends of 16 and the core 12. When the epoxy hardens, the cone-shaped coupling sections are permanently affixed to the substrate 44. An epoxy having an index of refraction near that of glass is selected to improve optical coupling efficiency.

The completed optical interferometer system comprises the interferometer described above and the optical fibers 10 affixed thereto to provide convenient input and output coupling.

After the optical interferometer is assembled, as described above, optical energy can be coupled to the optical fibers and taken therefrom using any conventional technique with the amount of light transmitted through the interferometer being modulated by the differential electric field across the two substantially parallel sections of the branches 48 and 50 of the optical waveguide 46.

Although the central section of the branches 48 and 50 of the optical waveguide 46 are shown as two substantially parallel portions, other configurations may be used. Electrodes 58, 60 and 62 may be formed by depositing metal on the substrate 44 using conventional processes. Shelf portion 64, grooves 52, 54, 56 and 66 may be formed by ion milling. Other modifications are also possible.

What is claimed is:

1. A single mode optical fiber coupling comprising: a section of single mode optical fiber including a cone-shaped portion comprising a fiber optic core having a polished end surface, a tapered cladding terminating near said polished end surface, the terminal end of said cladding having a diameter substantially equal to the diameter of said core, said cladding substantially uniformly tapering to a diameter substantially equal to the outer diameter of said optical fiber core, and a metal layer affixed to the outer surface of said cone-shaped portion of said single mode optical fiber.

2. An optical device comprising:
(a) a substrate of electro-optically sensitive material;
(b) an optical waveguide formed in and extending to the surface of said substrate and terminating at first and second edges of said substrate and including two spaced apart central portions having their ends joined to surround a first portion of said substrate surface, said substrate including a first groove in said first portion of said substrate surface, and second and third grooves in the surface alongside said spaced apart central portions of said optical waveguide and exterior to said first portion of said substrate surface;
(c) a first electrode affixed to a first portion of the surface of said substrate between said central portions; and
(d) second and third electrodes affixed to second and third portions of the surface of said substrate, alongside said central portions of said optical waveguide and exterior to said first portion of said substrate surface.

3. A method for forming a tapered coupling section of a single mode optical fiber, comprising the steps of:
(a) positioning a single mode optical fiber in a selected etchant;
(b) withdrawing said single mode optical fiber from said etchant at a selected rate to generate a tapered section comprising a portion of the cladding of said single mode optical fiber and a portion of the core of said single mode optical fiber;
(c) positioning said tapered section in an ion beam to selectively remove the end of said tapered section to form a polished end surface, and;
(d) forming a metal layer on the tapered portion of said cladding.

4. A method for forming a tapered coupling section in accordance with claim 3 wherein said etchant is hydrofluoric acid.

5. A method of coupling a single mode optical fiber to an optical waveguide, including the steps of:
(a) forming a shelf in the substrate utilized by said waveguide exposing the end of the optical waveguide;
(b) tapering the cladding of said optical fiber to form a cone-shaped section having a diameter substantially equal to the diameter of the core of said optical fiber;
(c) forming a metal layer on said tapered portion of said cladding;
(d) positioning the exposed end of said core adjacent the exposed end of said optical waveguide, and;
(e) affixing said single mode optical fiber to said optical waveguide with a material which adheres to the end portion of said core and to said waveguide.

6. A method of coupling an optical waveguide to a single mode optical fiber in accordance with claim 5 wherein said material which adheres to said end portion and to said waveguide is an epoxy selected to have an index of refraction which minimizes losses.

* * * * *